United States Patent
Franzius

(10) Patent No.: US 10,939,029 B2
(45) Date of Patent: Mar. 2, 2021

(54) METHOD AND SYSTEM FOR ASSISTING A USER IN PRODUCING AND SELECTING IMAGES

(71) Applicant: HONDA RESEARCH INSTITUTE EUROPE GMBH, Offenbach/Main (DE)

(72) Inventor: Mathias Franzius, Offenbach (DE)

(73) Assignee: HONDA RESEARCH INSTITUTE EUROPE GMBH

( * ) Notice: Subject to any disclaimer, the term of this patent is extended or adjusted under 35 U.S.C. 154(b) by 0 days.

(21) Appl. No.: 16/526,086

(22) Filed: Jul. 30, 2019

(65) Prior Publication Data
US 2020/0045222 A1    Feb. 6, 2020

(30) Foreign Application Priority Data
Jul. 31, 2018  (EP) .................... 18186525

(51) Int. Cl.
*H04N 5/232* (2006.01)
*B25J 9/00* (2006.01)
*H04N 5/225* (2006.01)

(52) U.S. Cl.
CPC ........ *H04N 5/23203* (2013.01); *B25J 9/0003* (2013.01); *H04N 5/2253* (2013.01); *H04N 5/23238* (2013.01)

(58) Field of Classification Search
CPC ............. H04N 5/23203; H04N 5/2253; H04N 5/23238; B25J 9/0003
See application file for complete search history.

(56) References Cited

U.S. PATENT DOCUMENTS

| | | | | |
|---|---|---|---|---|
| 9,152,873 | B2 * | 10/2015 | Sakai | H04N 5/23222 |
| 9,392,163 | B2 * | 7/2016 | Wu | H04N 5/23219 |
| 9,456,545 | B2 * | 10/2016 | Biber | A01D 34/008 |
| 2014/0072221 | A1 | 3/2014 | Sakai et al. | |
| 2017/0293297 | A1 | 10/2017 | Kim et al. | |
| 2018/0350106 | A1 * | 12/2018 | Kasilya Sudarsan | H04N 5/232939 |

OTHER PUBLICATIONS

"Studying aesthetics in photographic images using a computational approach," by R. Datta, D. Joshi, J. Li and J.Z. Wang in Proc. ECCV, pp. 288-301.

* cited by examiner

*Primary Examiner* — Luong T Nguyen
(74) *Attorney, Agent, or Firm* — Squire Patton Boggs (US) LLP

(57) ABSTRACT

The invention regards a method and respective system for assisting a user in producing and selecting images. When moving a moveable platform on which a camera is mounted, a plurality of images is captured with the camera. At least one image score for at least one region of the image is calculated in a processor, and those images, for which the at least one image score fulfils a selection condition, or identifiers of such images, are stored in a list in a memory. The stored images or the identifiers that allow retrieval of the stored images are output via an interface.

14 Claims, 2 Drawing Sheets

METHOD AND SYSTEM FOR ASSISTING A USER IN PRODUCING AND SELECTING IMAGES

BACKGROUND

Field

The invention regards a method for assisting a user in producing and selecting images and a respective system. The invention is in particular intended to produce and select images that create easily strong emotional response in humans and thus these images are more likely shared and rated on social media.

Description of the Related Art

Nowadays it is very common that people share images that are taken during their normal life, on social media. The social media include the opportunity of the participants to rate the shared media like an image or video. Thus, for people who share their images it is important to achieve high rates with their images. Although there are programs in the art available that assist a photographer directly while taking an image, it is still the burden of the photographer himself to decide when and where the picture shall be taken. A human photographer intentionally selects relevant and diverse views and is therefore limited in the amount of pictures that he takes. He is in particular not in a position to take pictures at any time of the day or while he is concerned with other actions.

On the other side image aesthetics estimation has been researched for decades. Recently developed models use computational (deep) machine learning models to predict human aesthetic perception of images like for example suggested in "Studying aesthetics in photographic images using a computational approach" by R. Datta, D. Joshi, J. Li and J. Z. Wang in Proc. ECCV, 2006, pp. 288-301. Such models have been learned on databases of images and human labels from social media. Although these models do not operate perfectly, and accuracy of 0.85 can be achieved and classification of images is therefore possible. A different interpretation of such models is that they directly predict image popularity on social media by predicting the number of shares, retweets, favourites etc.

On the other side digital photography enables to capture a huge number of images, in particular since memory becomes cheaper and cheaper. Further, image processing is possible, because processors have been developed with performances that allow to process even large amounts of data. But still, the selection of images that a user wants to share on any kind of social media finally lies with the user and it is almost impossible to go through all the images that are automatically captured. As a result, the user is effectively limited to share only such images that he captured himself, thus bringing us back to the problem mentioned above.

US 2014/072221 A1 discloses an image-processing device that automatically selects images in which sharpness of a photographic subject is relatively high compared with the sharpness of the background by calculating a score indicating the difference between the sharpness of the photographic subject region and the sharpness of the background region and comparing the calculated score with a threshold.

US 2017/293297 A1 discloses an unmanned photographing device that automatically captures an image of a subject based on photographing information indicating photographing position, screen composition and camera angle determined based on user ratings of reference images.

SUMMARY

It is an object of the invention to assist a user in producing and selecting images which are suitable for publication, for example sharing on social media platforms.

The problem is solved by the inventive method and corresponding system according to the independent claims. The dependent claims define advantageous aspects and features.

According to the method of the invention a user is assisted in producing and selecting images. At first, a movable platform is equipped with a camera. Such movable platforms may be any type of devices that autonomously or semi-autonomously move around. Examples for such movable platforms may be service robots, autonomous cars, drones, but also surveillance cameras like for example pan-tilt-cameras. Images are captured by the camera, usually while the movable platform is moving around. Thus, during the movement of the movable platform, images may be taken at different locations and also with different orientations and at different capturing times. Thus, in first place and without reflecting the images taken, a large number of images can be captured. Of course, images might also be captured during halt of the platform, for example, while the platform is being charged. Generally images are taken during operation of the moveable platform.

In order to select interesting images from this high number of images taken, at least one image score is calculated for at least one region of the image in a processor. At least one image score for the at least one region means that, of course, a plurality of image scores can be calculated being directed to different aspects of an image. For example, the image scores may regard aesthetics, including saliency, information content or surprise, objectness, classification scores and confidences. Of course, the aspect for which image scores may be calculated are not limited to the examples given. Further, it is possible to calculate one or more image scores not for the entire captured image but only for a specific region. Such a region may for example be an area having a predefined size around an object detected in the image. Of course, many other approaches to define such subregion of image may be thought of.

The at least one image score of an image is calculated based on features extracted from the image, wherein the type of a feature to be extracted depends on the desired aspect to which the image score is directed. In this way, predetermined visual features like average pixel intensity to characterize the use of light, relative color distribution distinguishing multi-colored mages from monochromatic, sepia or simply low contrast images, average saturation as the saturation indicator, image similarity (matching with other images of a data basis by using color, texture and shape information from automatically segmented regions) and/or well-focused object in the image while the surrounding is usually out of focus are extracted and estimated.

It is then analyzed if the one or more image score fulfills a selection condition. Images for which the selection condition is fulfilled by the one or more image scores, or identifiers of such images, are stored in a list in a memory. These identifiers or stored images of the list in the memory are finally output via an interface. It is to be noted, that it is sufficient to store and output an identifier that allows retrieval of the stored images.

The method is realized using a system comprising a movable platform having a camera mounted thereon. The system comprises a processor configured to execute the above-mentioned calculation of one or more image scores and an interface for outputting the images or identifiers.

With the present invention a user is assisted in generating images, because it is no longer necessary to personally review all images that potentially shall be shared on social media or published in any other way must be reviewed by the user. The underlying image database is not limited to images captured actively by the user. Contrary, a robot or any other type of vehicle, that moves around and that is equipped with a camera is used to automatically, for example at certain set time intervals, or continuously, capture images. Thus, at first, a large number of images is generated automatically without the user being involved. This significantly increases comfort for the user. Then, an automatic selection routine is started. This alleviates the burden for the user to go through all the images and consider himself which ones are interesting enough to be published or shared. Based on calculated image scores which may be directed to different aspects of an image taken, it is thus possible to make a preselection of the images and reduce the number of images that finally needs to be reviewed by the user. These images that need final review by the user are stored in a list or are to be retrieved by identifiers that are stored in the list. Of course, it is also possible to automatically upload the images that have been selected and stored in the list without further human review.

It is to be noted that in the following it will only be referred to storing the images in a list, but of course, any other way to identify images and to allow to copy or transmit the image for which the image scores fulfill the selection requirement, is also possible.

According to the present invention, the movable platform is moved with the aid of at least one motor and this at least one motor is driven by a motor controller. Thus, with the motor controller being advantageously connected to the processor, it is possible to influence the movement path based on a change of at least one image score with location and/or orientation. Although it is generally possible to distribute the components of the system, for example arranging the memory in the cloud, arranging the processor in a server configured to exchange data with the camera mounted on the movable platform, it is particularly preferred that all the components are included in one device, for example an autonomous lawnmower, an autonomous cleaning robot or the like. In such a case it is particularly easy to calculate changes of the at least one image score with the location of the camera and thus the movable platform. Consequently, it is possible to determine a movement path in accordance with such change, thereby improving the image score by moving the movable platform and consequently the camera to a location and having an orientation for which the resulting image captured at that location and with this orientation achieves a higher image score.

By analyzing changes of the at least one image score with respect to location and/or orientation it is therefore possible to define a movement path which the movable platform following towards a maximum of image scores and when the maximum is reached, the movable platforms movement is stopped. In this position, the camera is controlled to capture a time-lapse video. Thus, at first the best location and orientation of the camera is achieved which results in a high image score already and then additionally a plurality of images is taken at different points in time with unchanged location and orientation so that for this plurality of images being captured at different times, the influence of the time of the day can be exploited to generate an even more appealing image. According to another advantageous aspect, the processor calculates at least one first image score for a first region of the image and at least one second image score for a second region of the image. The first image region and the second image region advantageously are a left and a right region in the image. In such a case, it is particularly easy to compare the image score for the first region in the image score for the second region with each other and to change the heading direction of the movable platform towards the region, which in the previously captured image achieved a higher image score.

In particular, when the movable platform is a service robot like an autonomous lawnmower or a cleaning robot, generally the movement of the movable platform is defined by the regular operation of the service robot. But according to one advantageous aspect of the present invention, the regular operation of the movable platform is interrupted for moving the movable platform along the adapted movement path that was determined based on a gradient of the image scores and/or a comparison of image scores for different regions of the image. Of course, after images have been captured while the movable platform is moving along the determined movement path, the service robot may advantageously return to its regular operation. In that regard, it is to be noted, that adapting the movement path based on the gradient of image scores usually leads to local maxima, not the global maximum. Thus, after finding a maximum somewhere, restarting the process at a different position or after a period of time of "normal" operation will likely lead to other or even better scores.

Regular operation as mentioned above usually causes the movable platform to move in accordance with a predefined time schedule. According to another advantageous aspect of the present invention it is preferred to adapt this time schedule based on a prediction of image scores. Such prediction of image scores can either be made based on an analysis of already captured images, which allow for example to determine a dependency of image scores with time of day. Alternatively, advantageous times of the day can be predefined and used to adapt the schedule of operation of the service robot. As a consequence, it is possible to let the service robot operate at the time of the day when lighting conditions for example are usually considered resulting in more appealing images then at other times. Usually, this will be in the morning and in the late afternoon or in particular during sunset.

According to another advantageous aspect, the representative image is selected in case that the image scores of a plurality of images fulfill the selection condition and these images show a similarity degree above a certain threshold. This avoids that almost redundant images are stored in the list and finally output. The degree of similarity between the images is calculated automatically and the threshold for identifying two images as being similar to each other preferably can be adjusted.

Further, the images may be captured by an omnidirectional camera and before calculation of image scores is executed, the captured image is pre-processed to generate a panoramic image. Then, the method steps that have already been explained above are executed based on the panoramic image. Of course, it is also possible to pre-process images that have been taken using other camera types in order to remove distortions the are camera-type specific.

Further, it is advantages when capturing time, location and/or orientation of an image are stored associated with the image scores for this particular image. This allows to analyze the influence of the location, the orientation and/or the capturing time on the image scores achieved by an image. Knowledge about such dependency of the achieved image scores may then particularly advantageously be used to determine a movement path of the movable platform, so that the camera is moved together with the movable platform to locations and with an orientation that allows capturing images with an improved image score. Additionally or alternatively, images may be captured at times which have also proved to increase the image scores.

With the present invention the movable platform will move according to its regular operation or on a movement path that is determined taking into consideration the results of image scores for images captured in the past. Since it is possible to calculate the one or more image score for any image that was captured in the past, a large database is created allowing a detailed analysis thereof. Usually, such service robots operate in a limited area and they will consequently move to similar positions and may even have a similar orientation again and again. When at such a position and with such an orientation images are captured at different times, the influence of the time can be analyzed and thus a prediction for image scores can be made.

In order to improve readability of the explanations for the present invention it is to be noted that any time an "image score" is mentioned this may be in fact a single image score, or combined image score, but also a plurality of individual image scores regarding different aspects of the image.

BRIEF DESCRIPTION OF THE DRAWINGS

The invention will now be described with reference to the annexed drawings in which.

DETAILED DESCRIPTION

Figure 1:
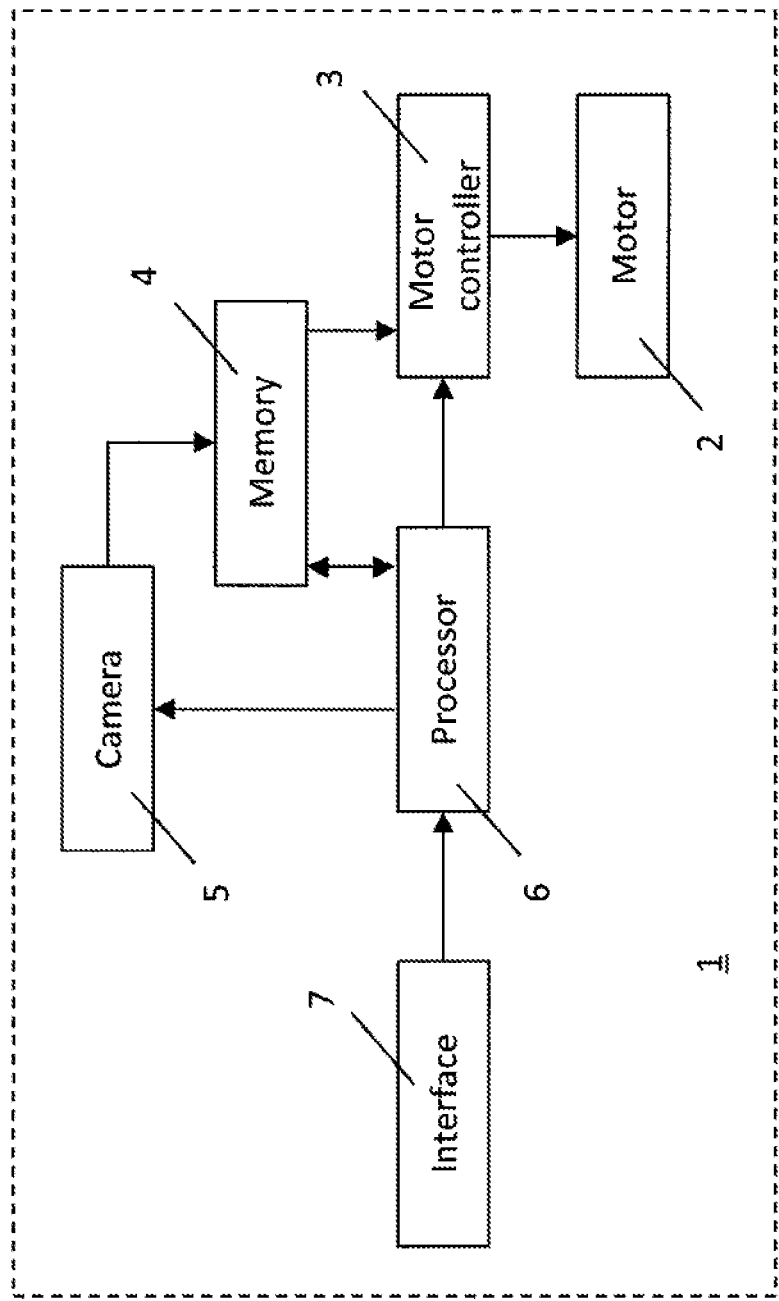
FIG. 1 shows a block diagram of the inventive system.

In FIG. 1, there is shown a simplified block diagram to illustrate the main components of the inventive system. The basic configuration of the system as shown in FIG. 1 is valid for all of the movable platforms that may be thought of for applying the present invention. Such movable platforms may be, as mentioned above, any kind of service robots, autonomous or semi-autonomous vehicles, drones, surveillance cameras and the like. It is also possible to transfer the general idea of the present invention even to create consumer camera assistance or photo apps, where movement of the movable platform is performed by a human carrying the camera and being guided by movement indications instead of generating control signals for an actuator of the movable platform.

Without limiting the scope of the present invention, explanations will now be made for the movable platform being an autonomous lawnmower 1, which is configured to autonomously mow a lawn and thus operate in an outside environment. The autonomous lawnmower 1 comprises at least one motor 2 for moving the autonomous lawnmower 1. Usually, a plurality of motors 2 are arranged in the autonomous lawnmower 1 so that adaption of the wheel speed of at least 2 driven wheels controls the driving direction of the autonomous lawnmower 1 but also its speed. The motor 2 is controlled by a motor controller 3 which generates control signals and transmits the same to the one or plurality of motors 2. The motor controller 3 is connected with a processor 6 which supplies the motor controller 3 with information used in the motor controller 3 to determine a movement path for the autonomous lawnmower 1. In case that the invention is applied to a consumer camera instead of the motor controller 3 display controller or a speaker controller may be used so that the display provided on the consumer camera or a speaker receive a signal allowing to indicate an intended direction of movement to the user. Such a display controller or a speaker controller in that case is configured to receive the information from the processor 6, determine a movement path and guide the user by an acoustic output by visual output accordingly.

The autonomous lawnmower 1 further comprises a memory 4. This memory 4 is connected with a camera 5, which is mounted on the autonomous lawnmower 1. It is to be noted that the memory 4 may be a single memory or may be comprised by a plurality of memories each serving a dedicated purpose like storing raw images or a list of selected images as it will be explained later. In the illustrated embodiment only a single memory 4 is used for all components of the inventive system. Images that are captured by camera 5 are stored in the memory 4. It is preferred that for analyzing the images that are captured by camera 5, all the images that are captured are kept in the memory 4. Of course, it is possible to delete some of the images from memory 4, for example when they are older than a period of time which preferably can be set by a user.

As mentioned, the illustrated embodiment is an autonomous lawnmower 1 having all the components necessary for executing the present invention and method mounted thereon. However, there is no difference in function to a distributed system, where in particular the memory is arranged in a cloud and even the processor 6 and its functionality could be realized by a processor on a server-side which is in communication and data exchange with the autonomous lawnmower or other movable platform according to the invention.

The processor 6 which is connected to the motor controller 3 in order to provide the motor controller 3 with information based on which a movement path may be determined, is also connected to memory 4. Thus, the processor 6 has access to the images that are stored in the memory 4 and can calculate an image score for each of the stored images. Of course, it is also possible that the images are only stored in a buffer memory (not shown in the figure) for being processed by processor 6. The memory 4 then will be used for storing only images for which the calculated image score (or combination of image scores) fulfill a selection condition, to be explained later.

In any case, the processor 6 is capable of controlling storing information in the memory 4 or retrieving data from the memory 4. The processor 6 is also connected to an interface 7. Via interface 7, the memory 4 may also be accessed by a user for example to store preferences in the memory 4 or any parameter that is necessary for regular operation of the autonomous lawnmower 1. On the other side, images that fulfill the selection condition can be transmitted via the interface 7 for example to use equipment where the user can further process the images. It is to be noted that the images that are transmitted via the interface 7 may either be directly uploaded to a social media app for example or may be transferred to a user for postprocessing.

In the processor 6 the calculation of image scores is performed. This might include preprocessing of images, if for example the camera 5 is an omnidirectional camera. In such a case the raw image as produced by the camera 5 is preprocessed in order to generate a panoramic image. Having stored this panoramic image in memory 4 the calculation of image scores may be started as in any case of regular images taken by camera 5. Processor 6 also controls the camera 5.

In the processor 6 an algorithm is executed which is generally known in the art. Of course, it is possible to calculate only one image score for an entire image or to calculate a plurality of different image scores separately for the same image. These plurality of image scores may be directed to different aspects such as aesthetics, saliency, information content or surprise, objectness, classification scores and confidences, or the like. It is also possible to combine a plurality of these image scores to result in a combined image score. The combination of individual image scores may use different weights for the separate image scores. Thus, adaption the weights for the different aspects allows a user to emphasize particular aspects. Such adaptation may be performed either when setting up the system or at a later stage during use of the autonomous lawnmower 1.

The calculation of the image scores or combined image score may either be performed for an entire image or for only a region in the image. Dividing an entire image into different regions may be done strictly following geometrical aspects or based on the results of object recognition in the image, for example with an identified object being the center of a patch having a predefined size. For the sake of conciseness in the following only the term "image score" is used and is always understood to include also a combined image score unless otherwise explained.

Once the operation of the autonomous lawnmower 1 has started, the lawnmower drives around for fulfilling his generic task of mowing the lawn and its movement path is determined accordingly. Nevertheless while driving around images are captured by camera 5 and during operation the autonomous lawnmower 1 thus collects a plurality of images. For each of the images that are captured by camera 5, processor 6 calculates an image score or a plurality of image scores. The image scores are stored in the memory 4 associated with the respective images, and advantageously together with a capturing time, location and orientation of the camera. The image scores that are calculated by the processor 6 are then compared with a selection condition. In the simplest case of only a single image score or one combined image score, the value of such image score may be compared to a threshold. If the image score is above the threshold, the respective image will be stored in a list of selected images in the memory 4. As mentioned above already, it is irrelevant if the image itself, or an identifier of the image, allowing to access the image data, is stored in the list. For easy understanding of the invention it is referred only to storing the image in the memory 4.

Instead of storing each of the images for which the image score exceeds the threshold in the list, it is also possible to have a list with only a defined maximum number of images having the best image scores. Thus, the number of images that finally needs to be output is always the same, regardless how many images are captured during motion of the autonomous lawnmower. This avoids that for one day with nice weather for example, where the system recognizes a high number of images fulfilling the selection criterion, a large number of images is finally output whereas on a cloudy day a significantly smaller amount of images will be output. Contrary, always the best for example 25 images will generate the list and be suggested or output to a user.

The images in the list are finally output via the interface 7. Outputting the images may either in response to a user request for transmission of the images, or maybe performed at predefined times, for example daily at a certain time or at the end of the month or the like. The list is then cleared and the entire process starts again. It is also possible to output automatically the list of images as soon as the operation of the autonomous lawnmower 1 ends. In that case it could be considered that the interface 7 is connected to a data line in a charging station of the autonomous lawn 1 automatically which in turn triggers the data transfer. Although it is generally possible that calculation of the image scores is performed online so that an immediate reaction, like estimating and following the image score gradient, on an analysis of all the calculated image scores may be performed, it is advantages to postpone the calculation of the image scores until the autonomous lawnmower 1 returns to his charging station. Thus, the power needed for calculating the image scores does not reduce the operation time for its energy consumption.

It is to be noted that the calculation of image scores itself is known in the art. Existing models are typically trained on large databases. The model itself can be used as a factory-default but can also be adapted later to the environment and to a user's preference automatically or by the user or by statistics from other products in the market. Users preferences may implicitly be learned from the users own scoring of images or explicitly by the user changing the weighting of different scores types. In that case the user may for example store in the memory 4 the weighting for aesthetics, novelty, spatial diversity or the like and thus the resulting combined image score will be calculated using the adapted weightings for the individual image scores.

Of course, it is possible to fine-tune the model on a domain-specific data set which in that case requires labelling. It is also possible to start from a factory-default model which is fine-tuned during an initial set up phase by the user. The user rates representative images that are displayed in an app, that runs on the user's mobile phone or the like. Based on such a collection of representative images the model used for calculating image scores can then be tuned or retrained.

According to an embodiment of the present invention, the combined image score includes an aesthetic score and an originality score. The aesthetic score can be calculated as disclosed in US 2014/072221 A1, wherein, for each captured image, the processor 6 calculates the difference between the sharpness of an object region and the sharpness of the background region.

Alternatively, the aesthetic score can be calculated as disclosed in R. Datta, et al.: "Studying aesthetics in photographic images using a computational approach", wherein, for each captured image, the processor 6 extracts a plurality of visual features, calculates feature values to quantify the extracted visual features with respect to aesthetics and performs a linear regression on polynomial terms of the feature values to determine the aesthetics score.

In order to extract visual features of exposure of light, colorfulness, saturation, hue, compliance with the rule of thirds, region composition, familiarity, wavelet-based texture, low depth of field and convex shapes, the image data of the captured image are converted to the HSV space (hue $I_H$, saturation $I_s$, value $I_v$, each of image dimension $X \times Y$) to analyse color tones and saturation and are converted to the LUV space to extract information from objects within the captured image. Some features can be extracted from objects within the image. An approximate way to find objects within images is segmentation, under the assumption that homogeneous regions correspond to objects.

The originality score is determined based on object(s) in the image captured by the camera 5 of the autonomous lawnmower 1, wherein an object unique and rarely observed results in a high originality score. For instance, animals score higher than flowers, flowers score higher than grass and flowering plants score higher than non-flowering plants. The processor 6 detects objects in each captured image by an image analysis, determines the type of each detected object and possibly also the object state (flowering/non-flowering) and determines the originality score based on a table assigning a score to the determined object type and state. The table is stored in the memory 4 and is generated by the manufacturer or user. Further, the processor 6 can be configured to update the table based on a user rating of the captured images and/or the rarity of objects (type and/or state) determined by the processor 6 based on the previously captured images.

The combined image score is a sum or product of the aesthetic score and the originality score, wherein, in the sum and product, the aesthetic score and the originality score may be weighted differently. The combined image score is compared to a threshold and, if the combined score is above the threshold, the image is stored in the list of selected images in the memory 4.

In order to assist a user even more to generate and select images that are suitable for publishing on social media, is also advantages to compute a description of the image and to store for example tags for detected objects in the image automatically. Such image tags may also be used to calculate the image score, as they may be used in a selection criterion which could be "contains flowers/animals" or "sunny" or the like. Further, images that fulfil the selection requirement, which is either a single threshold for the image score or combination of individual thresholds in case of a plurality of individual image scores according to different aspects, may be sorted in the list for which the criteria for sorting may advantageously be set by the user.

As a default it may be set that all the images are automatically captured, triggered by processors 6, during regular operation of the autonomous lawnmower 1. As it has been explained above already, for regular operation of the autonomous lawnmower 1 movement paths suitable for fulfilling the operation task of the autonomous lawnmower 1 is determined. But since the stored image scores associated with location, orientation and time of capturing the underlying image allow an analysis it is possible to influence the movement path of the autonomous lawnmower 1 in order to improve the image scores achieved by the captured images. For doing so the local change of the image scores, for example aesthetics score, is calculated and the direction of the highest ascent is estimated. Then, following the direction of the highest ascent, which is determined by the processor 6 and converted into a movement path and finally corresponding drive signals by the motor controller 3, the autonomous lawnmower 1 will be moved towards a position which allows to capture an image with an improved image score. Of course, deviating from the original movement path needs to interrupt regular operation of the autonomous lawnmower 1. Further, such deviation from the original movement path will result in change of the orientation of the autonomous lawnmower which finally may be corrected before the images captured. Generally, navigation of an autonomous devices based on slow feature analysis is known in the art and respective algorithms may be applied here. One advantage is that such an approach requires only a single scalar score for an image at a given position. In order not to jeopardize the original operation task, the time or distance for which an adaptation of the movement path is allowed, can be limited. Thus, in such a case, the autonomous lawnmower 1 will follow the adapted and newly determined movement path but then return to its regular operation even in case that further improvement of the image score could be achieved.

Additionally or alternatively the adapted movement path may be determined based on individual image scores for at least 2 differing regions included in the entire image. If for example an aesthetics score for the right half of a captured image is higher than the aesthetics score for the left half, the processor 6 may set a new destination for achieving a change of direction of the mower to the right side and output the respective indication signal to the motor controller 3. The motor controller 3 will then, based on the received signal, determine the movement path and generate signals for driving the motor 2 accordingly.

In the processor 6 it will further be estimated a future development of image scores for a given current view. For example, although the current position at a given time may result in a certain image score, it can be predicted that the image score for an image captured at a later time of the day (sunset) will regularly improve the image score. On the other side, even the date may be taken into account in order to set a capturing time for the camera 5. For example, dates of certain events may be stored in the memory 4, like full bloom of a rosebush. But also information like the weather forecast may be used to set the time for image capturing. Predicted sunshine in the afternoon for example may influence the achieved image score positively and thus, capturing times can be adapted based on such information. The processor 6 controls destinations based on which the motor controller 3 controls the motor to in order to move the autonomous lawnmower 1 indirection of a given destination. Additionally the processor 6 also triggers capturing images by the camera 5. Consequently all the information necessary to position the autonomous lawnmower 1 at a location, with an orientation and advantageous point in time available for the processor 6.

In order to improve the models that are used to calculate the image scores in the processes 6, it is preferred to collect user feedback on presented images. This feedback may be used to adapt the model parameters and/or the stored table and therefore influence the scores of the images.

Figure 2:
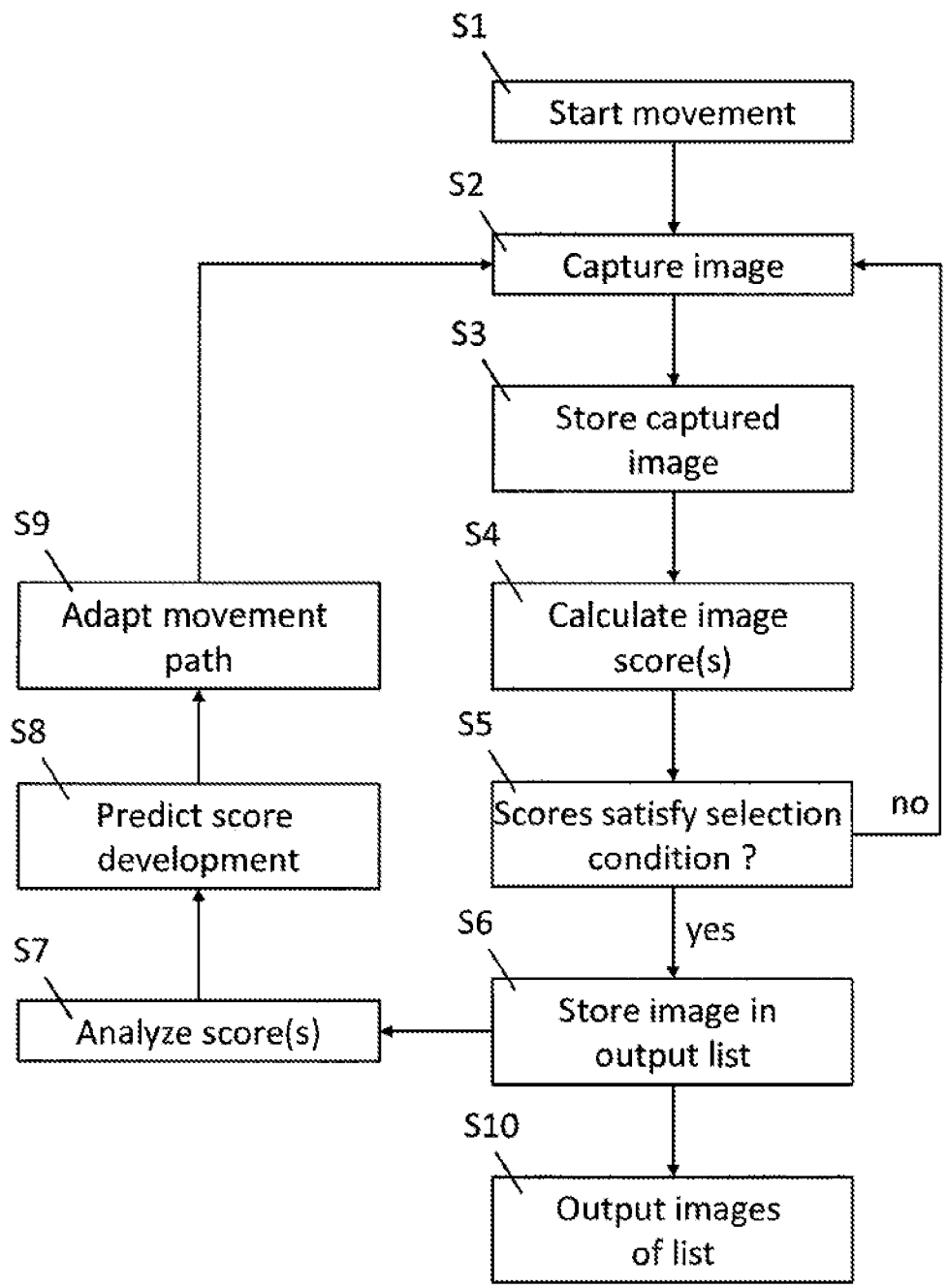
FIG. 2 shows a simplified flowchart illustrating the different method steps.

The main method steps are now explained with reference to FIG. 2. At first, the operation of the autonomous lawnmower 1 is started in the autonomous lawnmower 1 starts moving in step S1. While moving, according to a predefined time schedule and triggered by processor 6, the camera 5 captures images in step S2. These images are then in step S3, at least temporarily, stored in the memory 4 which is accessible to the processor 6 for further processing of the image data. In step S4 the processor 6 then calculates image scores for the stored images. In the flowchart illustrated in FIG. 2 the calculation of the image scores is performed in real-time. Thus, each time an image is captured by the camera 5 calculation of the image scores performed. As mentioned above, it is however also possible, to collect captured images at first, which are all stored in the memory 4 and thereafter, for example after returning to the charging station, calculating the image scores for all captured images one after the other.

For each of the images for which at least one image score is calculated it is determined in step S5 whether the calculated image score satisfies a selection condition for an appealing image. This appealing image is then stored in an output list in the memory 4. It is to be noted that even a plurality of different selection conditions may be stored in the memory 4 and that for all of the selection conditions it is determined whether the image score or combination of image scores of one image fulfills the respective selection condition. In case that a plurality of such selection conditions is defined, individual lists may be generated, each list corresponding to one respective selection condition. Storing the images in the output list may be done sorted or unsorted. Sorting may of course be done according to user input who specifies his preferences regarding the sorting rule. But in any case it is preferred that, associated with the respective image score, the location, orientation and time of the underlying image is stored to enable an analysis of the image scores in their dependency on circumstances and thus to allow an adaptation of the movement path.

If the image score does not satisfy the selection condition, no further action is taken and the autonomous lawnmower 1 will continue its regular operation. Thus, the camera 5 will continue capturing images according to a set time interval or any other trigger event that might be defined. It is to be noted, that satisfying the selection condition does not necessarily mean that the image score has to exceed a fixed threshold. It might also be the case that the image score is one of the best 25 image scores as mentioned above, regardless of its absolute value. The selection condition thus may also be defined by the worst image score currently stored in the output list.

After storing the images in the output list in step S6 stored images scores are analyzed in step S7 in order to adapt the movement path of the autonomous lawnmower 1. This analysis may be a gradient estimation as mentioned above but also a simple comparison of different regions of the image with respect to their image scores. Additionally or alternatively as depicted in step S8 the time development of image scores can be predicted. Such prediction may be based on information which is input into the system and stored in the memory, but may also be based on an internal analysis. Such analysis a for example use images captured at similar locations with similar orientations of the camera but at different points in time. Thus, if for example for a certain location and orientation a maximum of image scores is achieved between 4 PM and 8 PM operation that is started already at 2 PM may be postponed.

It is to be noted, that of course prediction of the image score development as mentioned in step S8 and gradient estimation based on the analysis as mentioned in step S7 may be combined. On the other hand, it is of course possible to base an adaptation of the movement path and only one of these aspects. Based on the results of the analysis and the prediction the movement path may be adapted as illustrated in step S9.

The operation of the autonomous lawnmower 1 is then based on the adapted movement path and the steps starting with capturing an image in step S2 I repeated. Of course, for executing the inventive method is not absolutely necessary that an analysis, prediction and adaptation of the movement path is performed. It is also possible to simply use the regular movement behavior of the autonomous lawnmower 1.

Finally, as shown in step S10 the images that are stored in the list output for further processing or uploading.

The invention claimed is:

1. A method for assisting a user in producing and selecting images comprising:

operating a moveable platform on which a camera is mounted;
capturing, with the camera, a plurality of images;
calculating at least one image score for at least one region of a captured image in a processor;
storing, from the plurality of images, images for which the at least one image score fulfils a selection condition, or identifiers of images for which the at least one image score fulfils the selection condition, in a list in a memory, wherein the selection condition is a single threshold for the at least one image score or a combination of thresholds in case of a plurality of image scores for one image; and
outputting the stored images or outputting the identifiers that allow retrieval of the stored images via an interface,
wherein the moveable platform is moved with aid of at least one motor and the at least one motor is driven by a motor controller that determines a movement path based on a change of the at least one image score with location or orientation.

2. The method according to claim 1, wherein
the movement path is determined towards a maximum of image scores and when the maximum is reached, the moveable platform's movement is stopped and the camera is controlled to capture a time-lapse video.

3. The method according to claim 1, wherein
the processor calculates at least one first image score for a first region of the image and at least one second image score for a second region of the image, the first and second image region being preferably a left and a right region in the image, and the movement path is determined based on a comparison of the at least one first image score and the at least one second image score.

4. The method according to claim 1, wherein
a regular operation of the moveable platform is interrupted for moving the moveable platform along the determined movement path.

5. The method according to claim 1, wherein
the moveable platform is moved in accordance with a predefined time schedule and the predetermined time schedule is adapted based on a prediction of image scores.

6. The method according to claim 1, wherein
the stored images or the identifiers of the stored images are output according to a time schedule or upon user input, wherein after the stored images or the identifiers of the stored images are output, the list is cleared.

7. The method according to claim 1, wherein
a representative image is selected in case that the at least one image scores of a plurality of images among the plurality of images captured fulfil the selection condition and the images of the plurality of images among the plurality of images captured show a similarity degree above a threshold.

8. The method according to claim 1, wherein
the plurality of images are captured by an omnidirectional camera and pre-processed to generate panoramic image.

9. The method according to claim 1, wherein
at the image scores for at least a part of the captured images are stored associated capturing time, location or orientation of a respective image.

10. The method according to claim 9, wherein
the moveable platform's movement path is determined based on an analysis of a dependency of the image scores on capturing location, orientation or time.

11. The method according to claim 9, wherein
change of image scores is predicted by analysing image scores of images captured at different capturing times and at similar locations and with similar orientation.

12. A system for assisting a user producing and selecting images comprising a moveable platform being configured to move with a camera mounted on the moveable platform, a processor, a memory connected to the processor, and an interface for outputting selected images or identifiers, wherein the processor is configured to control the system to execute the steps of:

operating the moveable platform;

controlling the camera to capture a plurality of images;

calculating at least one image score for at least one region of a captured image in the processor;

storing, from the plurality of images, images for which the at least one image score fulfils a selection condition, or identifiers of images for which the at least one image score fulfils the selection condition, in a list in the memory, wherein the selection condition is a single threshold for the at least one image score or a combination of thresholds in case of a plurality of image scores for one image; and outputting, via the interface, the stored images or the identifiers that allow retrieval of the stored images, wherein the moveable platform is moved with aid of at least one motor and the at least one motor is driven by a motor controller that determines a movement path based on a change of the at least one image score with location or orientation.

13. The system according to claim 12, wherein
the camera is a perspective camera or an omnidirectional camera.

14. The system according to claim 12, wherein
the moveable platform is a service robot, in particular a cleaning robot or a lawn mower.

* * * * *